US008980775B2

(12) United States Patent
Francy et al.

(10) Patent No.: US 8,980,775 B2
(45) Date of Patent: Mar. 17, 2015

(54) POWDER FOR GLASS-CERAMIC DRY REFRACTORY MATERIAL

(75) Inventors: Olivier Jean Francy, L'Isle sur la Sorgue (FR); Eric Jorge, Les Valayans (FR)

(73) Assignee: Saint-Gobain Centre de Recherches et D'Etudes European, Courbevoie (FR)

( * ) Notice: Subject to any disclaimer, the term of this patent is extended or adjusted under 35 U.S.C. 154(b) by 200 days.

(21) Appl. No.: 13/517,257

(22) PCT Filed: Dec. 21, 2010

(86) PCT No.: PCT/IB2010/055994
§ 371 (c)(1),
(2), (4) Date: Aug. 3, 2012

(87) PCT Pub. No.: WO2011/077382
PCT Pub. Date: Jun. 30, 2011

(65) Prior Publication Data
US 2012/0316053 A1 Dec. 13, 2012

(30) Foreign Application Priority Data
Dec. 24, 2009 (FR) ...................................... 09 59585

(51) Int. Cl.
*C03C 10/00* (2006.01)
*C04B 35/03* (2006.01)
*C04B 35/04* (2006.01)
(Continued)

(52) U.S. Cl.
CPC ................ *C04B 35/66* (2013.01); *B22D 41/02* (2013.01); *C04B 35/18* (2013.01); *C04B 35/19* (2013.01); *C04B 35/62665* (2013.01); *C04B 35/62675* (2013.01); *C04B 35/6303* (2013.01); *C04B 35/6316* (2013.01); *C04B 35/632* (2013.01); *F27D 1/0006* (2013.01); *C04B 2235/3201* (2013.01); *C04B 2235/3203* (2013.01); *C04B 2235/3206* (2013.01); *C04B 2235/3208* (2013.01); *C04B 2235/3215* (2013.01); *C04B 2235/3217* (2013.01); *C04B 2235/3232* (2013.01); *C04B 2235/3234* (2013.01); *C04B 2235/3241* (2013.01); *C04B 2235/3244* (2013.01); *C04B 2235/3272* (2013.01); *C04B 2235/3409* (2013.01); *C04B 2235/3418* (2013.01); *C04B 2235/3463* (2013.01); *C04B 2235/3472* (2013.01); *C04B 2235/3481* (2013.01); *C04B 2235/349* (2013.01); *C04B 2235/445* (2013.01); *C04B 2235/448* (2013.01); *C04B 2235/5427* (2013.01); *C04B 2235/5436* (2013.01); *C04B 2235/5472* (2013.01); *C04B 2235/6562* (2013.01); *C04B 2235/6565* (2013.01); *C04B 2235/72* (2013.01);
(Continued)

(58) Field of Classification Search
CPC .... C04B 35/043; C04B 35/03; C04B 35/195; C04B 35/66; C04B 35/14; C04B 35/18; C03C 10/0027; C03C 10/0045; C03C 10/0009
USPC ............... 501/2, 4, 5, 94, 108, 118, 127, 128, 501/133, 122
See application file for complete search history.

(56) References Cited

U.S. PATENT DOCUMENTS 4,125,409 A * 11/1978 Friedrichs et al. ............ 501/131
4,424,281 A * 1/1984 Jones .............................. 501/89
(Continued)

FOREIGN PATENT DOCUMENTS

AU          457462 B2     5/1972
CN          1525948 A     9/2004
(Continued)

OTHER PUBLICATIONS

Chinese Office action for Appliction No. 2010800592682 dated May 6, 2013 with English automatic translation.
(Continued)

*Primary Examiner* — Noah Wiese
(74) *Attorney, Agent, or Firm* — Cooper Legal Group, LLC

(57) ABSTRACT

The invention relates to a powder comprising more than 70% of glass-ceramic and/or refractory particles, a particle of said powder being classed in the fraction called "matrix" or in the fraction called "aggregate" according to whether it is smaller than, or equal to 100 µm, or bigger than 100 µm, respectively,
  the aggregate, representing more than 60% of the powder, comprising:
    more than 40% of particles of a glass-ceramic material having a crystallization rate of higher than 50% and a thermal expansion value, measured at 700° C., of less than 0.3%, called "glass-ceramic grains";
    less than 35% of particles of a refractory material different from a glass-ceramic material, called "refractory grains", the quantity of refractory grains being higher than 10% if the aggregate comprises more than 40% of glass-ceramic grains having a thermal expansion value, measured at 700° C., of less than or equal to 0.15%;
  the matrix, representing more than 10% of the powder, comprising:
    less than 30% of particles of a refractory material different from a glass-ceramic material, called "fine refractory particles", the quantity of fine refractory particles being higher than 5% and preferably lower than 25%, if the quantity of glass-ceramic grains having a crystallization rate of lower than 75% is higher than 5%;
    and between 0.1% and 18% of particles of a heat-activatable binder;
  all of the percentages being weight percentages in relation to the weight of the powder.

23 Claims, No Drawings

(51) Int. Cl.
- *C04B 35/00* (2006.01)
- *C04B 35/66* (2006.01)
- *B22D 41/02* (2006.01)
- *C04B 35/18* (2006.01)
- *C04B 35/19* (2006.01)
- *C04B 35/626* (2006.01)
- *C04B 35/63* (2006.01)
- *C04B 35/632* (2006.01)
- *F27D 1/00* (2006.01)

(52) U.S. Cl.
CPC ....... *C04B2235/727* (2013.01); *C04B 2235/77* (2013.01); *C04B 2235/96* (2013.01); *C04B 2235/9607* (2013.01); *C04B 2235/9676* (2013.01)
USPC ................ 501/2; 501/108; 501/118; 501/122

(56) References Cited

U.S. PATENT DOCUMENTS

| | | |
|---|---|---|
| 2005/0255986 A1* | 11/2005 | Kaneshige et al. ........... 501/120 |
| 2007/0203013 A1 | 8/2007 | Harmuth |

FOREIGN PATENT DOCUMENTS

| | | |
|---|---|---|
| CN | 1950313 A | 4/2007 |
| DE | 1020040 10739 A1 | 5/2004 |
| EP | 0931780 A1 | 7/1999 |
| EP | 1502905 A1 | 2/2005 |
| FR | 2528824 A1 | 12/1983 |

OTHER PUBLICATIONS

International Search Report dated Jun. 24, 2011.
R.N. McNally and G.H. Beall, "Crystallization of fusion cast ceramics and glass-ceramics," Corning Glass Works, Sullivan Park, Corning, NY, Journal of Material Science, 14, 1979, 2596-2604.

* cited by examiner

POWDER FOR GLASS-CERAMIC DRY REFRACTORY MATERIAL

TECHNICAL FIELD

The invention relates to a powder of the dry refractory ramming material or "DVC", "dry vibratable mix" or "dry refractory" type, especially intended for the manufacture of lining for furnaces, for example induction furnaces, in particular for melting metals.

The invention also relates to a consolidated product obtained from a powder according to the invention and to a process for manufacturing such a product.

PRIOR ART

A lining of a furnace for melting metals should especially have:
good corrosion resistance with respect to the metal being melted;
good crack resistance;
good resistance to infiltration by the molten metal; and
good thermal shock resistance.

For this purpose, use is made of the products obtained by consolidation heat treatment of powders of DVC type, such as described for example in EP 1 224 153.

A powder of DVC type is a powder which, unlike a concrete, can be used "dry", that is to say without addition of water or of liquid binder, or, rarely, with a very reduced amount of water or of liquid binder (typically less than 3%), unlike a concrete. This is why, unlike a concrete, a powder of DVC type does not conventionally comprise any binder capable of setting via addition of water. The possible teachings which could be drawn from the study of documents relating to concretes cannot therefore, a priori, be transposed to powders of this type.

The forming of a powder of DVC type conventionally results from a simple compaction at ambient temperature, the consolidation resulting from a subsequent consolidation heat treatment.

Equally conventionally, a powder of DVC type is constituted of refractory particles and particules of a heat-activatable binder. The temperature of the consolidation heat treatment is between the melting point of the heat-activatable binder and that of the refractory particles. During the consolidation heat treatment, the heat-activatable binder can thus change from the solid state to a viscous liquid state enabling adhesion to the refractory particles and bonding between the latter. The change from the solid state to this viscous liquid state is referred to as "activation" of the binder.

The heat-activatable binder is also chosen so as to be able to be in this viscous liquid state at a temperature close to the operating temperature of the furnace, in particular during the first temperature rise. This viscous liquid state thus advantageously makes it possible to reduce the rigidity of the sintered product, facilitating its deformation and thus increasing its ability to adapt to local thermomechanical stresses. During the following temperature rises, this liquid state may be modified, and may especially become rigid via an enrichment of fine particles.

The article "*Spinel formation in coreless induction furnace linings*", Saikia et al., Proceedings of the 4th International Symposium on Advances in Refractories for the Metallurgical Industries, p 827-840 (2004) describes powders of DVC type based on alumina and/or on $MgAl_2O_4$ spinel. The sintered products obtained from these powders have good resistance to corrosion by the metals being melted. However they have a limited thermal shock resistance, especially in the case of melting light alloys or aluminum alloys, because of severe thermal shocks. The thermal shocks create cracks that are the cause of prejudicial phenomena of infiltration by the metals being melted.

JP 3 183 656 describes powders of DVC type based on crystallized silica. The sintered products obtained from these powders have the advantage of good thermal shock resistance, especially during repetitive temperature rises and drops. However, these sintered products have a limited corrosion resistance and limited resistance to infiltration by the metals being melted. They also pose health problems during their installation, especially due to the potential presence of crystalline silica dust.

To improve the thermal shock resistance, it is known to add fine particles of monoclinic zirconia or grains of mullite-zirconia and/or of alumina-zirconia. The accident of thermal expansion of the zirconia creates a network of microcracks that favor the absorption of the crack propagation energy. For this purpose, it is also known to add fine silica particles.

There is a constant need for a powder that makes it possible to manufacture consolidated products, especially sintered products, having a good thermal shock resistance and a good resistance to infiltration by the metals being melted, while retaining a good corrosion resistance.

One objective of the invention is to satisfy this need.

SUMMARY OF THE INVENTION

The invention relates to a powder comprising more than 70%, preferably more than 80%, more than 90% of glass-ceramic and/or refractory particles, a particle of said powder being classified in the "matrix" fraction or in the "aggregate" fraction depending on whether it has a size less than or equal to 100 μm, or greater than 100 μm, respectively, the aggregate, representing more than 60% of the powder, comprising:
more than 40% of particles of a glass-ceramic material having a degree of crystallization of greater than 50% and a thermal expansion value measured at 700° C. of less than 0.3%, referred to as "glass-ceramic grains";
less than 35% of particles made of a refractory material different from a glass-ceramic material, referred to as "refractory grains", the amount of refractory grains being greater than 10% if the aggregate comprises more than 40% of glass-ceramic grains having a thermal expansion value measured at 700° C. of less than or equal to 0.15%;

the matrix, representing more than 10% of the powder, comprising:
less than 30% of particles made of a refractory material different from a glass-ceramic material, referred to as "fine refractory particles", the amount of fine refractory particles being greater than 5% and, preferably, less than 25%, if the amount of glass-ceramic grains having a degree of crystallization of less than 75% is greater than 5%;
between 0.1% and 18% of particles of a heat-activatable binder, in particular an inorganic binder or at least one resin, referred to as "fine heat-activatable binder particles";

all the percentages being by weight in relation to the weight of the powder.

As will be seen in greater detail in the remainder of the description, the inventors have discovered that a powder according to the invention results in a product that has particularly good resistance to thermal shocks and to infiltration, while retaining a good corrosion resistance.

A powder according to the invention may also comprise one or more of the following optional characteristics:
- preferably, the matrix represents more than 15%, preferably more than 20% and/or less than 40%, preferably less than 35% of the weight of the powder, the balance being, by definition, constituted by the aggregate.
- The powder has the following characteristics:
  - the maximum size of the particles is less than 5 mm, and
  - the amount of particles having a size greater than 300 μm is greater than 50% and less than 70%, and
  - the amount of matrix is greater than 15%, preferably greater than 20%, and less than 40%, and
  - the amount of particles having a size of less than 75 μm is greater than 10% and less than 35%.
- The material of the glass-ceramic grains is identical to or different from that of the fine glass-ceramic particles.
- All the glass-ceramic particles are constituted of the same material.
- The material of the refractory grains is identical to or different from that of the fine refractory particles.
- The powder preferably comprises more than 1%, more than 2%, more than 3%, more than 4%, more than 5%, and/or less than 15%, less than 12%, less than 10%, or even less than 8%, or even less than 6% of heat-activatable binder.
- Preferably, the heat-activatable binder has a melting point of greater than 5° C., preferably of greater than 15° C., preferably of greater than 20° C., or even greater than 30° C., greater than 50° C., greater than 70° C., greater than 80° C., greater than 150° C., and/or less than 1500° C., less than 1300° C., less than 1200° C.
- Preferably, the heat-activatable binder has a melting point between 150° C. and 1200° C.
- Preferably, the heat-activatable binder is not a metal.
- The heat-activatable binder is selected from the group formed by boron oxide, boric acid, borates, cryolite, fluoride salts, silicate compounds, phosphate compounds, feldspars, magnesium chlorides, colemanite, clay, kaolin, amorphous silica, in particular fumed silica, resins, ceramic frits, and mixtures thereof. The resin may in particular be chosen from phenolic resins, furan resins, acrylic resins, polyester resins, epoxide resins, silicone resins, siloxane resins, alkyd resins, polyvinyl resins, and mixtures thereof. In one particular embodiment, the resin is chosen from particulate products that can be converted to a polymer during the consolidation heat treatment.
- Preferably, the heat-activatable binder is selected from the group formed by sodium borates, potassium borates, calcium borates, boric acid, boron oxide, clay, fluoride salts, and mixtures thereof. Preferably, the heat-activatable binder is selected from the group formed by boric acid, boron oxide, clay, fluoride salts, and mixtures thereof.
- Preferably, the heat-activatable binder is inorganic.
- The powder comprises more than 2%, more than 3%, or even more than 4% and/or less than 10%, less than 8% or even less than 7% of clay.
- The powder comprises more than 0.5%, more than 1%, and/or less than 5%, less than 4% or even less than 3% of boric acid.
- The powder comprises more than 0.1%, more than 0.5% and/or less than 5%, less than 3%, or even less than 2% of potassium fluoroborate.
- The powder contains an agent that makes it possible to reduce, or even eliminate, the dust during the installation of the powder. This "anti-dust agent" may be selected from the group formed by oils, in particular mineral oils, kerosene, organic polymers and mixtures thereof. Preferably, this agent is kerosene. Preferably, the amount of anti-dust agent is between 0.1% and 1%.
- The powder contains at least one agent that makes it possible to reduce the wettability of said powder and/or of the consolidated product obtained from said power to the metals being melted. Preferably, this "anti-wetting agent" is chosen from silicon carbide, barium sulphate, SiAlON compounds, nitrides. Preferably, this agent is chosen from silicon carbide and barium sulphate. More preferably, the anti-wetting agent is barium sulphate. Preferably, the anti-wetting agent is introduced in the form of particles having a size of less than or equal to 100 μm. Preferably, the amount of anti-wetting agent is between 5% and 15%, preferably between 5% and 10%.
- The refractory particles and the particles of the heat-activatable binder together represent more than 81%, more than 85%, more than 90%, more than 93%, or even more than 95%, or even more than 98% of the weight of the powder.
- The powder is more than 95%, or even more than 98%, or even substantially 100% constituted of refractory or glass-ceramic grains, of fine refractory or glass-ceramic particles, of heat-activatable binder particles, of anti-dust agent particles and of anti-wetting agent particles, the possible balance to 100% being constituted of impurities, for example of iron originating from a milling step.
- The impurities represent less than 3%, less than 2%, or even less than 1%.
- The powder does not contain hydraulic binder or organic binder apart from, optionally, a resin. In a first embodiment, the powder contains neither hydraulic binder, nor organic binder apart from, optionally, a resin. In a second embodiment, the powder contains neither hydraulic binder nor organic binder.

The aggregate of a powder according to the invention may also comprise one or more of the following optional characteristics:
- The maximum size of the particles of the aggregate, referred to as "grains", is less than or equal to 10 mm, preferably less than or equal to 8 mm, preferably less than or equal to 6 mm, or even less than or equal to 4 mm.
- The amount of grains having a size of greater than 300 μm is greater than 50% and/or less than 70%.
- The amount of glass-ceramic grains is greater than 45%, greater than 50%, or even greater than 55% and/or less than 80%, or even less than 70%, or less than 65%.
- Said glass-ceramic grains have a maximum size preferably of less than or equal to 10 mm, preferably of less than or equal to 8 mm, preferably of less than or equal to 6 mm, or even less than or equal to 4 mm.
- The amount of glass-ceramic grains having a size of greater than 1 mm, on the basis of the amount of glass-ceramic grains, is greater than 30%, preferably greater than 40%, preferably greater than 50%, preferably greater than 60%, or even greater than 70%.
- The aggregate comprises more than 40% of glass-ceramic grains having a degree of crystallization of greater than 60%, greater than 70%, or even greater than 75%, or even greater than 80% or greater than 85%.
- More than 90%, preferably more than 95%, preferably substantially 100% of the glass-ceramic grains, as a percentage by weight on the basis of the glass-ceramic grains, have a degree of crystallization of greater than 75%, preferably greater than 85%, preferably greater than 90% or even greater than 95%.

The glass-ceramic material of the glass-ceramic grains has crystals of virgilite and/or spodumene and/or indialite and/or cordierite and/or beta-quartz and/or mullite and/or celsian and/or hexa-celsian, preferably crystals of virgilite and/or cordierite.

The glass-ceramic material of the glass-ceramic grains has a glass transition temperature greater than 700° C., or even greater than 750° C.

The aggregate comprises more than 5%, preferably more than 10%, and/or preferably less than 30% of refractory grains.

Said refractory grains have a maximum size preferably of less than 5 mm, preferably of less than 4 mm, preferably of less than 2 mm, preferably of less than 1 mm.

The refractory grains are made of a material chosen from the group formed by alumina, magnesia, chromium oxide, silica, bauxite, mullite, zirconia, partially stabilized zirconia, stabilized zirconia, mullite-zirconia, alumina-zirconia, magnesia-alumina spinel, zircon, cordierite, aluminum titanate, argillaceous chamottes containing between 30% and 50% of alumina, preferably between 35% and 45% of alumina, wollastonite, alumina-zirconia-silica (or "AZS") materials, alumina-zirconia-silica-chromium oxide (or "AZS-Cr") materials, bauxite, alumina-reinforced zirconias, alumina-titanium oxide-zirconia materials, and mixtures thereof. Preferably, the refractory grains are made of a material chosen from the group formed by alumina, mullite, argillaceous chamottes containing between 30% and 50% of alumina, preferably between 35% and 45% of alumina, bauxite and mixtures thereof. Preferably, the refractory grains are made of a material chosen from the group formed of alumina, mullite and mixtures thereof.

The alumina-titanium oxide-zirconia material may especially have the following chemical composition, in percentages on the basis of the oxides of said material:
10% ≤ $Al_2O_3$ ≤ 55%,
35% ≤ $TiO_2$ ≤ 80%,
1% ≤ $MgO+Cr_2O_3$ ≤ 10%,
8% ≤ $ZrO_2$ ≤ 20%,
$SiO_2$ ≤ 8%.

The aggregate comprises less than 20%, less than 10%, or even less than 5%, on the basis of the total amount of heat-activatable binder, or even substantially no particles made of said heat-activatable binder, referred to as "binder grains".

The matrix of a powder according to the invention may also comprise one or more of the following optional features:

The amount of fine particles having a size of less than 75 μm is between 10% and 35%.

The matrix contains fine refractory particles made of a refractory material chosen from the group formed by alumina, magnesia, chromium oxide, silica, bauxite, mullite, zirconia, partially stabilized zirconia, stabilized zirconia, mullite-zirconia, alumina-zirconia, magnesia-alumina spinel, zircon, cordierite, aluminum titanate, argillaceous chamottes containing between 30% and 50% of alumina, preferably between 35% and 45% of alumina, wollastonite, alumina-zirconia-silica (or "AZS") materials, alumina-zirconia-silica-chromium oxide (or "AZS-Cr") materials, bauxite, alumina-reinforced zirconias, alumina-titanium oxide-zirconia materials, and mixtures thereof. Preferably, said refractory material is chosen from the group formed by alumina, mullite, argillaceous chamottes containing between 30% and 50% of alumina, preferably between 35% and 45% of alumina, bauxite and mixtures thereof. More preferably, said refractory material is chosen from the group formed of alumina, mullite and mixtures thereof.

The alumina-titanium oxide-zirconia material may especially have the following chemical composition, as percentages on the basis of the oxides of said material:
10% ≤ $Al_2O_3$ ≤ 55%,
35% ≤ $TiO_2$ ≤ 80%,
1% ≤ $MgO+Cr_2O_3$ ≤ 10%,
8% ≤ $ZrO_2$ ≤ 20%,
$SiO_2$ ≤ 8%.

The amount of fine refractory particles is greater than 10%, preferably greater than 15%, and/or less than 27%, less than 25%.

The matrix comprises less than 20%, less than 10%, or even less than 5%, or even substantially no particles made of a glass-ceramic material having a degree of crystallization of greater than 50% and a thermal expansion value measured at 700° C. of less than 0.3%, referred to as "fine glass-ceramic particles".

The amount of fine refractory particles is greater than 5%, preferably greater than 10%, preferably greater than 15%, or even greater than 20% and, preferably, less than 25%, and the amount of glass-ceramic grains not comprising crystals of virgilite and/or spodumene and/or indialite and/or cordierite and/or beta-quartz and/or mullite and/or celsian and/or hexa-celsian is greater than 5%.

The amount of fine heat-activatable binder particles is preferably greater than 1%, greater than 3%, greater than 5%, and/or preferably less than 15%, preferably less than 10%, or even less than 8% or even less than 6%.

The invention also relates to a product obtained by consolidation heat treatment of a powder according to the invention, in particular in the form of a block or a lining.

The product preferably comprises more than 1%, more than 2%, more than 3%, more than 4%, more than 5%, and/or less than 15%, less than 12%, less than 10%, or even less than 8%, or even less than 6% of heat-activatable binder and/or of product of conversion of said heat-activatable binder resulting from said consolidation heat treatment.

The invention also relates to a process for manufacturing a consolidated product according to the invention, comprising the following successive steps:
a) preparation of a feedstock from a powder according to the invention;
  (1) the feedstock comprising a powder according to the invention and the liquid phase in said feedstock representing less than 3%, preferably less than 2%, more preferably substantially 0% of the weight of the feedstock; or
  (2) the feedstock being constituted of a mix comprising water and/or a temporary binder, as described below;
b) forming said feedstock by pressing, ramming or vibration;
c) consolidation heat treatment of the formed feedstock at a temperature above the melting point of the heat-activatable binder, and less than the melting point of the refractory and glass-ceramic particles.

This process may be implemented in order to manufacture the side wall and bottom of a crucible of an induction furnace. The side wall and the bottom of such a crucible together constitute the "lining" of the furnace.

In case (1), the water, or even the liquid phase in said feedstock, preferably represents less than 2% of the weight of the feedstock. More preferably, and in particular for a coreless induction furnace lining, the feedstock does not comprise water, or temporary binder.

The bottom of the crucible, or "floor", is produced by pouring into the chamber of the furnace, the feedstock, preferably constituted of a powder according to the invention. The layer thus constituted is then for example rammed or vibrated. After a leveling operation which also makes it possible to eliminate the upper layer of the floor that is more weakly densified, a mold is provisionally positioned on the layer thus obtained.

In order to produce the side wall of the crucible, the pouring of the feedstock is then continued between the chamber of the furnace and the mold positioned in said chamber, preferably until the feedstock surrounds the mold over its entire height. Said chamber may especially be constituted of a layer of insulating materials.

Preferably, the feedstock is compacted by vibration. The compaction may be carried out as the feedstock is poured.

A temperature rise then enables activation of the heat-activatable binder, that is to say enables the heat-activatable binder particles to melt into a viscous form, and thus ensure the cohesion of the refractory and glass-ceramic particles.

In step c), the consolidation heat treatment is preferably carried out at a temperature above the operating temperature $T_{operating}$. The duration of the hold at the maximum temperature reached during the consolidation heat treatment is preferably greater than 30 minutes, preferably greater than 1 hour and/or less than 10 hours, preferably less than 3 hours.

The consolidation heat treatment may be a sintering.

After cooling, the heat-activatable binder forms a binder phase between the refractory and glass-ceramic particles. A product that is said to be "consolidated" is thus obtained. Typically, the open porosity of such a consolidated product is between 10% and 30%.

If the activation temperature was not reached over the entire thickness of the side wall and of the bottom of the crucible, a portion of the crucible, in particular in the vicinity of the inductor of the furnace, may not be consolidated.

After the consolidation heat treatment step, the mold is removed or eliminated and the crucible is ready to be used for melting metal.

This process for manufacturing a consolidated product may also be carried out for the manufacture of individual blocks intended to be assembled with other blocks. It is then preferable, according to option (2), to add to the powder a temporary binder and/or water. A mix is then obtained which can be poured into a mold and which makes it possible, after step b), to obtain a preform having, at ambient temperature, a "cold" strength.

The invention also relates to such a mix.

Preferably, the amount of temporary binder in this mix is greater than 0.5% and/or less than 6%, and the amount of water is greater than 2% and/or less than 6%, or even less than 5%, as percentages by weight relative to the weight of the powder before addition of the temporary binder and water.

Temporary binders conventionally used for the manufacture of sintered ceramic blocks may be used, for example dextrin, a calcium lignosulphonate, CMC, or a PEG.

The invention also relates to the use of a consolidated product according to the invention in an application in which at least one part of said consolidated product is subjected to an operating temperature $T_{operating}$ below the maximum consolidation heat treatment temperature.

The invention also relates to a furnace for melting metals that comprises at least one region constituted of a consolidated product according to the invention, in particular a region intended to be in contact with a metal being melted.

The furnace may in particular be a furnace for melting aluminum, aluminum alloys, such as for example the alloy of reference 42200 according to the standard NF EN 1706, magnesium alloys, zinc alloys or copper alloys.

Of course, the nature of the refractory grains is determined such that the melting point of said grains is above the temperature to which it is anticipated to subject said region.

Preferably, the glass-ceramic material of the glass-ceramic grains has a glass transition temperature $T_g$ greater than the temperature to which it is anticipated to subject said region (operating region $T_{operating}$), reduced by 50° C., that is to say such that $T_g>T_{operating}-50°$ C. Occasionally, a reduction of 100° C. may be envisaged, that is to say $T_g>T_{operating}-100°$ C.

Finally the invention relates to a process for manufacturing a furnace, in particular a furnace for melting metals, in which at least one block made of a product according to the invention is assembled or in which a crucible comprising a product according to the invention is manufactured, in particular in a region intended to come into contact with the metal being melted.

Preferably, the glass-ceramic material of the glass-ceramic grains of said product has a glass transition temperature $T_g$ greater than the temperature at which it is anticipated to use said product, reduced by 50° C.

DEFINITIONS

The term "powder" is understood mean a dry particulate mix.

The term "particles" refers to the constituent solid elements of a powder. The particles of the matrix are referred to as "fine particles" and the particles of the aggregate are referred to as "grains".

The "size" of a particle is given conventionally by a characterization of particle size distribution. A laser particle size analyzer enables, for example, the measurement of sizes of less than or equal to 5 mm.

The percentiles or "centiles" 10 ($D_{10}$), 50 ($D_{50}$), 90 ($D_{90}$) and 99.5 ($D_{99.5}$) of a powder are the sizes of particles corresponding to the percentages, by weight, of 10%, 50%, 90% and 99.5% respectively on the cumulative particle size distribution curve of the particles of the powder, the sizes of particles being classified in increasing order. For example, 10%, by weight, of the particles of the powder have a size of less than $D_{10}$ and 90% of the particles by weight have a size of greater than $D_{10}$. The percentiles may be determined using a particle size distribution produced using a laser particle size analyzer.

The expression "maximum size" refers to the percentile 99.5 ($D_{99.5}$) of said powder.

The expression "median size" refers to the percentile $D_{50}$, that is to say the size dividing the particles into first and second populations that are equal by mass, these first and second populations comprising only particles having a size greater than, or less than respectively, the median size.

The expression "glass-ceramic material" is understood to mean a microcrystalline compound obtained by controlled crystallization of a precursor glass. The glass-ceramic materials are compounds of very fine crystallizations (microcrystallizations), having a mean size of less than 1 μm, swimming in a residual glassy phase. The amount of glassy phase does not limit the invention and may be present in a very small amount.

The controlled crystallization of a precursor glass (in the solid state), usually takes place during a step that follows, immediately or otherwise, the step of obtaining said precursor glass. The controlled crystallization is customarily referred to as "crystallization heat treatment" or "glass-ceramization heat treatment".

The products manufactured by melting-cooling which, during their manufacture, do not pass through a step in which they are in the glass state are not therefore glass-ceramic materials. Molten corindon, molten alumina, molten spinels, molten magnesia, molten mullite, molten mullite-zirconia, optionally doped molten aluminum titanate, and molten nitrides are not, in particular, glass-ceramic materials.

When a particle of a powder according to the invention is made of a material that is both glass-ceramic and refractory, it is considered to be a "glass-ceramic particle", that is to say depending on its size, to be a "glass-ceramic grain" or to be a "fine glass-ceramic particle".

The expression "glass-transition temperature" of a glass-ceramic material is understood to mean the middle of the temperature interval in which said glass-ceramic material becomes gradually more viscous and changes from the liquid state to the solid state. The glass transition temperature of glass-ceramic materials may be determined by differential thermal analysis (DTA).

The expression "thermal expansion value" measured at 700° C., is understood to mean the ratio $100 \cdot (L_{700°C.} - L_0)/L_0$, where 700° C., and $L_0$ denote the length of a sample of the product at 700° C. and at ambient temperature respectively. The thermal expansion values may especially be measured as described in the examples.

The expression "degree of crystallization" of a glass-ceramic material is understood to mean the weight percentage of crystalline phases contained in said material.

The term "impurities" is understood to mean the inevitable constituents, introduced involuntary and inevitably with the raw materials or resulting from reactions with these constituents. The impurities are not necessary constituents, but only tolerated constituents. Preferably, the amount of impurities is less than 2%, less than 1%, less than 0.5%, or even substantially zero.

The expression "refractory material" is understood to mean a material having a melting point above 1500° C. This definition is commonly used by a person skilled in the art and is cited in "*Matériaux réfractaires et céramiques techniques (éléments de céramurgie et de technologie)* [Engineering refractory and ceramic materials (ceramurgy and technology components)]", G. Aliprandi, published by Septima Paris, 1979. This work also gives, on pages 297 to 301, examples of refractory materials, especially oxides, carbides and nitrides.

The expression "heat-activatable binder" is understood to mean a constituent which, under the effect of an increase in the temperature, will liquefy into a viscous form suitable for agglomerating the particles of a refractory powder in which it is mixed. By way of examples, boric acid, potassium tetrafluoroborate and cryolite melt at melting points between 150° C. and 300° C., of around 530° C. and of 1010° C., respectively, giving viscous phases capable of agglomerating the particles of a powder according to the invention, that is to say capable of resulting in a structured (self-supporting) product.

The term "borate" is understood to mean a compound of oxoanions based on boron and on electropositive elements. The oxoanion based on boron may be the borate oxoanion $BO_2^-$, the diborate oxoanion $B_2O_5^{4-}$, the triborate oxoanion $B_3O_5^-$, the tetraborate oxoanion $B_4O_7^{2-}$. Sodium tetraborate $Na_2B_4O_7$, lithium triborate $LiB_3O_5$, magnesium diborate $Mg_2B_2O_5$ are examples of borates. The borates may also be hydrated, such as for example borax $Na_2B_4O_7 \cdot 10H_2O$.

The term "temporary" is understood to mean "eliminated from the product during the consolidated heat treatment".

Unless otherwise indicated, all the percentages are expressed by weight relative to the weight of the powder.

Conventionally, the characteristics relating to a state of matter (melting point, viscosity, etc.) are provided at a pressure of 1 bar, unless otherwise indicated.

DETAILED DESCRIPTION

Preferably, a powder according to the invention is formed by the sole mixing of refractory particles, glass-ceramic particles and heat-activatable binder particles.

All the refractory particles used according to the prior art technique may be envisaged, for the matrix and for the aggregate.

The inventors have discovered that the addition of glass-ceramic particles remarkably improves the properties of the consolidated product obtained from the powder, provided that:
the aggregate contains a large amount of glass-ceramic particles;
the degree of crystallization of the glass-ceramic particles of said aggregate is high;
the thermal expansion value of the glass-ceramic particles of said aggregate is low at a temperature close to the operating temperature (conventionally around 700° C.).

The glass-ceramic particles are preferably chosen so that the glass transition temperature of a particle is at most 50° C. below the maximum temperature to which said particle is subjected in operation, irrespective of the particle considered. In other words, the latter temperature should not exceed said glass transition temperature by more than 50° C.

Preferably, the glass transition temperature of a glass-ceramic particle, irrespective of the particle considered, is greater than or equal to the temperature to which it is subjected in operation.

It is however necessary that, in the aggregate, the amount of grains made of a refractory material different from a glass-ceramic material is less than 35%.

Temporarily, especially during the first temperature rise, the operating temperature may exceed the maximum glass transition temperature of the particles. Preferably, this exceedance remains however limited to less than 100° C.

A degree of crystallization of greater than 50% has proved necessary so that the performances in contact with the metal being melted and of softening under load in operation are suitable for the envisaged use.

A degree of crystallization of greater than 75% makes it possible to obtain excellent performances, whether the matrix comprises refractory particles or not.

If the degree of crystallization is between 50% and 75%, the performances are lower. However, the inventors have discovered that the presence, in the matrix, of an amount of fine refractory particles between 5% and 25% makes it possible to maintain a corrosion resistance and a resistance to infiltration by the metals being melted that are acceptable for the targeted applications.

The glass-ceramic must be ceramized in the glass-ceramic particles of the powder. Specifically, a crystallization after forming of the powder, for example during the consolidation heat treatment or during the first startup of the furnace, would result in unacceptable shrinkage.

Furthermore, although the thermal expansion value of the glass-ceramic particles of said aggregate must be low, the inventors have however discovered that it does not have to be as low as possible. In particular, they have discovered that the performances degrade when this thermal expansion value is less than or equal to 0.1%. This degradation of the performances may however be at least partly compensated for by the presence, in the aggregate, of refractory grains, preferably in an amount between 10% and 35%.

On the other hand, if the thermal expansion value is greater than 0.1%, the presence of refractory grains in the aggregate is optional. Preferably, the amount thereof is then less than 30%.

The choice of the heat-activatable binder must be made, in particular, as a function of the operating temperature. More specifically, this binder must be activatable under the operating temperature. By way of example, it is not envisaged to use cryolite as heat-activatable binder for an application in which the operating temperature would be below 950° C.

The heat-activatable binder must also be chosen so as to have a melting point below that of the glass-ceramic and/or refractory particles. During the consolidation heat treatment, the heat-activatable binder may thus change from the solid state to a viscous liquid state enabling adhesion to the glass-ceramic and/or refractory particles and bonding between the latter.

A powder according to the invention may be manufactured by mixing raw materials having suitable particle sizes, crystallizations and compositions.

All the known means for compacting a powder according to the invention are possible, especially pressing, ramming, casting or vibration.

Preferably, the particle size distribution of a powder according to the invention is suitable for favoring the compaction thereof. Compaction models such as the Fuller-Bolomey model or the Andreasen may be used in order to determine the most suitable particle size distribution.

Examples

The powders of the various examples were manufactured in the following manner.
Preparation of the Glass-Ceramic Particles A feedstock that is suitable as a function of the chemical analysis of the glass-ceramic particles of the desired powder is melted in an arc furnace. The bath of molten material, of around 15 kg, is poured into a 200-liter water tank, enabling rapid quenching and avoiding crystallization.

The precursor glass thus obtained is a mix of amorphous particles having a size of less than 20 mm. The amorphous state of the particles is verified by X-ray diffraction. The particles are then dried at 110° C. for 48 hours, then subjected to a glass-ceramization (or "crystallization") heat treatment. This heat treatment mainly comprises a nucleation (or "germination") hold and a crystallization growth hold, which are defined as a function of the glass transition temperature $T_g$ and of the crystallization peak which are determined by differential thermal analysis (DTA).

The glass-ceramization heat treatments are the following:
glass-ceramic particles of examples 2 and 3:
from 20° C. to 750° C.: increasing at 300° C./h
hold of 1 hour at 750° C.
from 750° C. to 950° C.: increasing at 300° C./h
hold of 1 hour at 950° C.
decreasing at 300° C./h down to 20° C.
glass-ceramic particles of example 4:
from 20° C. to 750° C.: increasing at 300° C./h
hold of 1 hour at 750° C.
from 750° C. to 950° C.: increasing at 300° C./h
hold of 10 hours at 950° C.
decreasing at 300° C./h down to 20° C.
glass-ceramic particles of examples 5, 6 and 7:
from 20° C. to 780° C.: increasing at 300° C./h
hold of 4 hours at 780° C.
from 780° C. to 1020° C.: increasing at 300° C./h
hold of 10 hours at 1020° C.
decreasing at 300° C./h down to 20° C.
glass-ceramic particles of example 8:
from 20° C. to 790° C.: increasing at 300° C./h
hold of 4 hours at 790° C.
from 790° C. to 1200° C.: increasing at 300° C./h
hold of 2 hours at 1200° C.
decreasing at 300° C./h down to 20° C.

After glass-ceramization heat treatment, the particles are ground in a jaw crusher and screened so as to obtain the desired particle size fractions.

The analyses of the glass-ceramic particles used are given in table 1 below (weight percentages). The balance to 100% is constituted of impurities.

The thermal expansion value measured at 700° C. of a glass-ceramic material is carried out on a monolithic cylinder of said material machined from one of the amorphous particles having a size of less than 20 mm and glass-ceramized. This cylinder has a diameter of 12 mm and a height between 10 and 15 mm.

The height of the cylinder is measured at ambient temperature using a Setaram Setsys evolution TMA 1750 vertical dilatometer. The measurement is carried out using a single hemispherical probe with silica components. The length $L_0$ at ambient temperature and $L_{700°\,C.}$, the length at 700° C., are measured. The thermal expansion value measured at 700° C. is equal to the ratio $100 \cdot (L_{700°\,C.} - L_0)/L_0$.

The glass transition temperature $T_g$ is measured by DTA.

TABLE 1

| Glass-ceramic particles | Ex. 2, 3 | Ex. 4 | Ex. 5, 6, 7 | Ex. 8 |
| --- | --- | --- | --- | --- |
| $SiO_2$ | 65.2 | 65.2 | 65.8 | 56.3 |
| $Al_2O_3$ | 21.3 | 21.3 | 22.0 | 20.0 |
| $LiO_2$ | 5.0 | 5.0 | 3.5 | — |
| MgO | 0.7 | 0.7 | 0.1 | 14.6 |
| $TiO_2$ | 2.8 | 2.8 | 2.4 | 8.6 |
| $ZrO_2$ | — | — | 2.3 | — |
| $P_2O_5$ | — | — | 0.6 | — |
| $Fe_2O_3$ | — | — | 0.1 | 0.1 |
| CaO | — | — | — | 0.2 |
| $Na_2O$ | 0.5 | 0.5 | — | 0.1 |
| $K_2O$ | 0.1 | 0.1 | 0.3 | — |
| BaO | 1.6 | 1.6 | — | — |
| Crystals | Spodumene | Spodumene | Virgilite | Indialite |
| $T_g$ (° C.) | 700 | 700 | 760 | 770 |
| Thermal expansion value at 700° C. (%) | 0.1 | 0.1 | 0.1 | 0.26 |
| Degree of crystallization (%) | 65 | 90 | 88 | 87 |

Preparation of the Parts to be Tested

The various particulate constituents, including the heat-activatable binder, are introduced into a mixer, and dry mixed for 5 minutes.

The various particulate constituents used are the following:
- white corindon having an alumina content of greater than 99.6%, and a grain density equal to 3.95 g/cm$^3$;
- brown corindon, having an alumina content of greater than 95%, a silica content of less than 1.2%, a titanium oxide content of less than 3%, an iron oxide content of less than 0.25%, and a grain density of greater than 3.85 g/cm$^3$;
- calcined alumina AC44B6 sold by RIO TINTO ALCAN;
- clay, having an alumina content equal to 28% with respect to dry product, a percentile $D_{90}$ equal to 40 μm and a loss on ignition measured after heat treatment at 1000° C. for one hour equal to 9%;
- boric acid, having an $H_3BO_3$ equivalent of greater than 99.9% and a median size $D_{50}$ equal to 100 μm;
- potassium fluoroborate ($KBF_4$), typically containing 96% by weight of potassium fluoroborate, and having a size of less than 100 μm.

Each powder thus obtained is introduced into a mixer, also added to which is 1% of dextrin powder, this percentage being relative to the weight of said powder. After 5 minutes of mixing, 3% of water, as a percentage relative to the weight of the initial powder (therefore without dextrin powder) are added gradually, without stopping the mixer. After introducing all the water, the mixing is continued for 5 minutes.

The addition of a temporary binder such as dextrin and water are necessary for the manufacture of small samples, but not during an industrial application of the powder in order to form a furnace lining.

The wet mixes are then poured into molds suitable for the manufacture of the following parts:
- a consolidated brick having dimensions of 230×114×60 mm$^3$ used for machining bars having dimensions of 150×25×25 mm$^3$ comprising no skin face and as intended for physico-mechanical characterizations (bulk density, open porosity, relative loss of flexural strength after a thermal shock),
- a cylinder having a diameter of 50 mm and a height of 60 mm pierced at its centre with a hole having a diameter of 12 mm, intended for the thermal expansion measurements,
- a consolidated brick having dimensions of 230×114×60 mm$^3$ comprising two holes having a diameter of 35 mm and a depth of 30 mm, intended for the tests of infiltration by the metals being melted.

For this purpose, the wet mix poured into the molds is subjected to uniaxial pressing, at a pressure of 90 MPa. The preforms thus obtained are demolded then dried for 24 hours at 110° C.

The cylinder intended for the thermal expansion measurements is not heat treated.

The bricks are consolidated in the following heat cycle:
from 20° C. to 750° C.: increasing at 150° C./h
hold of 2 hours at 750° C.
decreasing at 150° C./h down to 20° C.

Characterization

The particle size fractions of the powders are determined by dry screening for the grades of $D_{10}$>45 μm and using a HORIBA laser particle size analyzer for the grades of $D_{90}$<100 μm.

The chemical analysis is determined by X-ray fluorescence spectroscopy for the elements having a content of greater than 0.1 wt %. If the content of an element is less than 0.1 wt %, it is determined by ICP (Induction Coupled Plasma), on a Vista AX model (sold by the company Varian).

The measurements of the bulk density and of the open porosity after consolidation heat treatment are carried out according to the following method: the bars mentioned above are firstly dry weighed to determine their dry weight Ms. They are then placed in a bell jar under vacuum of air for 30 minutes. The bell jar is then filled with water, so that the bars are completely immersed. After immersion, the vacuum is maintained for 30 minutes. Atmospheric pressure is then re-established in the bell jar and the samples are left to rest again for 30 minutes. The samples are then subjected to hydrostatic weighing, giving a weight Mi. They are then wiped with a wet cloth and their wet mass Mh is measured.

The bulk density is given by the ratio ρ·Ms/(Mh−Mi), in g/cm$^3$, with p being the density of water, taken as being equal to 1 g/cm$^3$.

The open porosity is given by the ratio 100 (Mh−Ms)/(Mh−Mi), in %.

The resistance to infiltration by the metals being melted is determined by placing the consolidated brick pierced with two holes in contact with a metal being melted. For this purpose, the holes are filled with shavings of an aluminum-silicon alloy of reference 42220 according to the standard NF EN 1706. The whole assembly is then brought to a temperature of 800° C. for a hold time limited to eight hours. After cooling, the infiltration depth is measured.

The relative loss of flexural strength after a thermal shock makes it possible to evaluate the ability of a product to undergo such a shock.

The standardized test PRE III.26/PRE/R.5.1/78 is used to determine the behavior to thermal shocks via the relative loss of flexural strength (% MOR loss) after one cycle consisting in placing a test specimen at a temperature of 600° C., in maintaining the specimen at this temperature for one hour, then in submerging the specimen in cold (20° C.) water.

The specimens are bars as described above heated at 110° C. for 48 hours before carrying out the test.

The flexural strength is measured according to the standard ISO 5014, with a support span of 125 mm. For a given composition, the measurement of the initial flexural strength of the specimens (not subjected to a thermal shock), or "initial MOR" is the mean value measured over three identical specimens; the measurement of the strength after the thermal shock at 600° C., "MOR after TS" is the mean value of the flexural strength measured at ambient temperature on the three specimens after they have undergone said thermal shock; the measurement of the relative loss of flexural strength "% MOR loss" is given by the following formula:

$$\% MOR\ \text{loss} = 100 \cdot (MOR\ \text{after}\ TS - \text{initial}\ MOR)/(\text{initial}\ MOR)$$

The degree of crystallization of the glass-ceramic is measured by X-ray diffraction. The X-ray diffraction diagrams are acquired with a D5000 diffractometer, with a copper anti-cathode, from the company Bruker. The acquisition is carried out over a 2θ angular range between 5° and 80°, in steps of 0.02° and a time of 1 s/step. A 0.6 mm receiving slit is used and the sample is rotated on itself so as to limit the effects of preferred orientations. The acquisition time is increased by a factor of 2 in order to obtain better statistical counting.

The nature of the crystallized phases present is determined with EVA software and the database of ICDD files.

The percentage of amorphous phases is measured with High Score Plus software supplied by the company PANalytical. The method uses the Rietveld refinement by adding to the sample a known percentage of a common crystallized standard, in this case zinc oxide ZnO. The sample is a pellet obtained by mixing, in an agate mortar, 0.4 g (i.e. 20% by weight) of ZnO having a purity of greater than 99% by weight and a size of less than 1 µm and 1.6 g (i.e. 80% by weight) of the glass-ceramic material ground to a size of less than 40 µm.

The amorphous phases are not visible with the Rietveld method, only the crystallized phases are taken into account and the sum thereof is standardized to 100%.

In the case where at least one amorphous phase is also present, the amount of crystallized phases must be corrected: the addition of a known amount of the crystallized standard makes it possible to carry out a correction of the amount of all the crystallized phases present, and thus enables the determination of the percentage of amorphous phases present, % CompAm.

The degree of crystallization is given by the following formula: 100−% CompAm, as a weight percentage.

The measurement of the expansion value from table 2 is carried out on non-consolidated cylinders having a diameter of 50 mm passed through by a central hole having a diameter of 12 mm, obtained directly by pressing and dried for 24 hours at 110° C. This measurement is carried out according to the standard EN993-19. The measurement is performed by an RDP brand, DCT 500A model LVDT sensor, with a comparator made of dense sintered alumina.

Results

Table 2 below summarizes the results obtained.

The inventors consider that the results are particularly satisfactory if they fulfill the following compromise:
(a) The infiltration depth of the metal is less than or equal to 1 mm, preferably 0;
(b) The MOR loss after thermal shock is less than or equal to 30%.

Furthermore, the inventors consider that, in order to avoid cracking, it is essential that the expansion value measured at 700° C. of the product remains positive.

As is now clearly apparent, the invention provides a powder that makes it possible to manufacture consolidated products having a good thermal shock resistance and a good resistance to infiltration by the metals being melted.

Furthermore, other tests have shown that a powder according to the invention is easy to install, has a low cost and that it results in a consolidated product having a good chemical inertia with respect to the metals being melted, capable of effectively withstanding corrosion by these metals being melted. A consolidated product according to the invention is therefore perfectly suitable for an application in a furnace for melting metals.

Of course, the invention is not limited to the embodiments provided by way of examples.

The invention claimed is:

1. A powder comprising more than 70% of glass-ceramic and/or refractory particles, a particle of said powder being classified in the "matrix" fraction or in the "aggregate" fraction depending on whether it has a size less than or equal to 100 µm, or greater than 100 µm, respectively, the aggregate, representing more than 60% of the powder, comprising:

TABLE 2

| | | Example: | | | | | | | |
|---|---|---|---|---|---|---|---|---|---|
| | | 1 | 2 | 3 | 4 | 5 | 6 | 7 | 8 |
| Composition (weight percentages on the basis of the powder) | | | | | | | | | |
| Aggregate | | | | | | | | | |
| Glass-ceramic grains | ≤5 mm | — | 71 | 42 | 39 | 76 | 44.5 | 62 | 42 |
| White corindon grains | ≤1 mm | 20 | — | 28 | 28.5 | — | 24 | 11 | 26 |
| Brown corindon grains | ≤1 mm | 14 | — | — | — | — | — | — | — |
| Brown corindon grains | 1 to 5 mm | 40 | — | — | — | — | — | — | — |
| Total refractory grains | | 74 | 0 | 28 | 28.5 | 0 | 24 | 11 | 26 |
| Total aggregate | | 74 | 71 | 70 | 67.5 | 76 | 68.5 | 73 | 68 |
| Amount of glass-ceramic grains having a size of greater than 1 mm, in percentages on the basis of the amount of glass-ceramic grains | | 0 | 50.4 | 70 | 77 | 50.5 | 67 | 54 | 73 |
| Matrix | | | | | | | | | |
| Fine white corindon particles | | 14 | — | 18 | 22 | — | 21 | 14.5 | 20 |
| Fine brown corindon particles | | 2 | — | — | — | — | — | — | — |
| Fine calcined alumina particles | 0 to 50 µm | 2 | 3 | 2.5 | 2.5 | 3.5 | 2.5 | 3 | 3 |
| Fine glass-ceramic particles | | — | 14.5 | 1 | 1 | 15 | 1 | 4 | 2 |
| Total fine refractory and glass-ceramic particles | | 18 | 17.5 | 21.5 | 25.5 | 18.5 | 24.5 | 21.5 | 25 |
| Clay | | 5 | 7 | 5.5 | 5.5 | 5 | 5.5 | 5 | 5.5 |
| Boric acid | | 2 | 3 | 2 | 1 | 0.3 | 1 | 0.3 | 1 |
| KBF4: potassium fluoroborate | | 1 | 1.5 | 1 | 0.5 | 0.2 | 0.5 | 0.2 | 0.5 |
| Total amount of fine binder particles | | 8 | 11.5 | 8.5 | 7 | 5.5 | 7 | 5.5 | 7 |
| Total matrix | | 26 | 29 | 30 | 32.5 | 25 | 31.5 | 25.5 | 32 |
| Properties of the consolidated product | | | | | | | | | |
| Bulk density (g/cm$^3$) | | 3.07 | 2.09 | 2.44 | 2.53 | 2.12 | 2.52 | 2.31 | 2.55 |
| Open porosity (%) | | 18.5 | 15.7 | 19.2 | 17.8 | 18.7 | 18.3 | 19.0 | 18.0 |
| Thermal expansion value at 700° C. (%) | | 0.65 | 0 | 0.15 | 0.26 | −0.05 | 0.20 | 0.05 | 0.29 |
| % MOR loss (%) | | 46 | — | 15 | 32 | 0 | 13 | 7 | 30 |
| Infiltration depth of the metal (mm) | | 0 | 6 | 0 | — | — | 0 | 0 | — | more than 40% of particles of a glass-ceramic material having a degree of crystallization of greater than 50% and a thermal expansion value measured at 700° C. of less than 0.3%, referred to as "glass-ceramic grains";

less than 35% of particles made of a refractory material different from a glass-ceramic material, referred to as "refractory grains", the amount of refractory grains being greater than 10% if the aggregate comprises more than 40% of glass-ceramic grains having a thermal expansion value measured at 700° C. of less than or equal to 0.15%;

the matrix, representing more than 10% of the powder, comprising:

less than 30% of particles made of a refractory material different from a glass-ceramic material, referred to as "fine refractory particles", the amount of fine refractory particles being greater than 5% and, if the amount of glass-ceramic grains having a degree of crystallization of less than 75% is greater than 5%;

between 0.1% and 18% of particles of a heat-activatable binder, referred to as "fine heat-activatable binder particles";

all the percentages being by weight in relation to the weight of the powder.

2. The powder as claimed in claim 1, wherein the heat-activatable binder is an inorganic binder and/or at least one resin.

3. The powder as claimed in claim 2, comprising more than 40% of glass-ceramic grains having a degree of crystallization of greater than 75%.

4. The powder as claimed in claim 1, wherein the amount of glass-ceramic grains is greater than 50% and less than 65%.

5. The powder as claimed in claim 1, wherein the amount of glass-ceramic grains having a size of greater than 1 mm, on the basis of the amount of glass-ceramic grains, is greater than 40%.

6. The powder as claimed in claim 1, wherein the glass-ceramic material of said glass-ceramic grains has crystals of virgilite and/or spodumene and/or indialite and/or cordierite and/or beta-quartz and/or mullite and/or celsian and/or hexa-celsian.

7. The powder as claimed in claim 1, wherein the glass-ceramic material of said glass-ceramic grains has a glass transition temperature of greater than 700° C.

8. The powder as claimed in claim 1, wherein the matrix comprises less than 20% of particles made of a glass-ceramic material having a degree of crystallization of greater than 50% and a thermal expansion value measured at 700° C. of less than 0.3%, referred to as "fine glass-ceramic particles".

9. The powder as claimed in claim 1, wherein the refractory grains and/or the fine refractory particles are made of a material chosen from the group formed by alumina, magnesia, chromium oxide, silica, bauxite, mullite, zirconia, partially stabilized zirconia, stabilized zirconia, mullite-zirconia, alumina-zirconia, magnesia-alumina spinel, zircon, cordierite, aluminum titanate, argillaceous chamottes containing between 30% and 50% of alumina, wollastonite, alumina-zirconia-silica (or "AZS") materials, alumina-zirconia-silica-chromium oxide (or "AZS-Cr") materials, bauxite, alumina-reinforced zirconias, alumina-titanium oxide-zirconia materials, and mixtures thereof.

10. The powder as claimed in claim 1, wherein the amount of fine refractory particles is less than 25%.

11. The powder as claimed in claim 1, wherein the heat-activatable binder is selected from the group formed by boron oxide, boric acid, borates, cryolite, fluoride salts, silicate compounds, phosphate compounds, feldspars, magnesium chlorides, colemanite, clay, kaolin, amorphous silica, in particular fumed silica, phenolic resins, furan resins, ceramic fits, and mixtures thereof.

12. The powder as claimed in claim 11, wherein the heat-activatable binder is selected from the group formed by sodium borates, potassium borates, calcium borates, boric acid, boron oxide, clay, fluoride salts, and mixtures thereof.

13. The powder as claimed in claim 1, wherein the amount of heat-activatable binder particles in the matrix is greater than 3% and less than 10%.

14. The powder as claimed in claim 1, wherein the heat-activatable binder has a melting point between 150° C. and 1200° C.

15. The powder as claimed in claim 1, wherein the amount of fine refractory particles is greater than 5% and the amount of glass-ceramic grains not comprising crystals of virgilite and/or spodumene and/or indialite and/or cordierite and/or beta-quartz and/or mullite and/or celsian and/or hexa-celsian is greater than 5%.

16. The powder as claimed in claim 1, comprising neither hydraulic binder nor organic binder apart from, optionally, a resin.

17. The powder as claimed in claim 1, wherein
the maximum size of the particles is less than 5 mm, and
the amount of particles having a size greater than 300 μm is greater than 50% and less than 70%, and
the amount of matrix is greater than 15% and less than 40%, and
the amount of particles having a size of less than 75 μm is greater than 10% and less than 35%.

18. The powder as claimed in claim 1, wherein the amount of refractory and/or glass-ceramic grains, of fine refractory and/or glass-ceramic particles, of heat-activatable binder particles, of anti-dust agent particles and of anti-wetting agent particles is greater than 95%.

19. A mix comprising a powder as claimed in claim 1, and
a temporary binder in an amount of greater than 0.5% and less than 6%, and/or
water in an amount of water of greater than 2% and less than 6%, in percentages by weight relative to the weight of the powder before addition of the temporary binder and water.

20. A consolidated product obtained by consolidation heat treatment at a temperature above the melting point of the heat-activatable binder of a powder as claimed in claim 1 or of a mix as claimed in the preceding claim.

21. A furnace for melting metals comprising at least one region intended to be in contact with a metal being melted, said region being constituted of a consolidated product as claimed in claim 20.

22. A process for manufacturing a consolidated product as claimed in claim 20, comprising the following successive steps:

a) preparation of a feedstock from a powder as claimed in claim 1,
(1) the feedstock comprising a powder as claimed in claim 1 and the liquid phase in said feedstock representing less than 3% of the weight of the feedstock; or
(2) the feedstock being constituted of a mix as claimed in claim 19;

b) forming said feedstock by pressing, ramming or vibration;

c) consolidation heat treatment of the formed feedstock at a temperature above the melting point of the heat-activatable binder.

23. The powder as claimed in claim 1, the amount of fine refractory particles being less than 25% if the amount of glass-ceramic grains having a degree of crystallization of less than 75% is greater than 5%.

\* \* \* \* \*

UNITED STATES PATENT AND TRADEMARK OFFICE
CERTIFICATE OF CORRECTION

PATENT NO. : 8,980,775 B2  
APPLICATION NO. : 13/517257  
DATED : March 17, 2015  
INVENTOR(S) : Olivier Jean Francy et al.

Page 1 of 1

It is certified that error appears in the above-identified patent and that said Letters Patent is hereby corrected as shown below:

IN THE SPECIFICATION  
Column 9, line 32, please delete "700°C." and insert therefor --$L_{700°C}$.--

Signed and Sealed this  
Twenty-second Day of March, 2016

Michelle K. Lee  
*Director of the United States Patent and Trademark Office*